United States Patent [19]

Suzuki

[11] Patent Number: 5,566,583
[45] Date of Patent: Oct. 22, 1996

[54] SHIFTING APPARATUS OF AUTOMATIC TRANSMISSION

[75] Inventor: Yasuhito Suzuki, Shizuoka-ken, Japan

[73] Assignee: Fujikiko Kabushiki Kaisha, Tokyo, Japan

[21] Appl. No.: 345,113

[22] Filed: Nov. 28, 1994

[30] Foreign Application Priority Data

Nov. 30, 1993 [JP] Japan .................... 5-300003

[51] Int. Cl.⁶ .................................. F16H 59/00
[52] U.S. Cl. .................. 74/477; 74/473 SW; 70/247; 477/99
[58] Field of Search ............... 74/477, 473 SW; 477/99; 70/245, 246, 247, 248

[56] References Cited

U.S. PATENT DOCUMENTS

| | | | |
|---|---|---|---|
| 4,267,743 | 5/1981 | Tanaka | 74/473 SW |
| 4,905,802 | 5/1990 | Gotoh | 70/247 X |
| 4,932,493 | 6/1990 | Sakurai et al. | 477/99 X |
| 4,934,208 | 6/1990 | Carlstrom | 74/473 SW |
| 4,986,143 | 1/1991 | Livshits et al. | 477/99 X |
| 5,105,676 | 4/1992 | Sabel et al. | 70/247 X |
| 5,207,124 | 5/1993 | Anderson et al. | 477/99 |
| 5,309,744 | 5/1994 | Kito et al. | 70/248 X |
| 5,421,792 | 6/1995 | Kataumi et al. | 477/99 |

*Primary Examiner*—Charles A. Marmor
*Assistant Examiner*—Peter Kwon
*Attorney, Agent, or Firm*—Hopkins & Thomas

[57] ABSTRACT

A shifting apparatus for an automatic transmission mounted on a steering column (10), comprises: a shift lever (30) shifted from a park position to drive positions formed in a shift plate (61); a selector member (50) formed with a detent portion (51) selectively engaged with one of shift positions of the shift plate when the lever (30) is shifted; a shift lever lock mechanism having: a shift lock member (90) for locking the selector member (50); a switch (70) turned on by the selector member (50) when the shift lever is set to the park position; an actuator (80) energized when the switch (70) is turned on to move the shift lock member (90) to a shift lock position; and an actuation member (100) associated with the selector member (50) and the shift lock member (90) between the shift lock position and a shift unlock position; and a key lock mechanism (200) for locking and unlocking the actuation member (100) via a key lock cable (105). When the engine is started, the actuation member 100 is unlocked from the key lock mechanism (200) and when a brake pedal is further depressed, the lock member (90) is unlocked by the actuator (80), so that the shift lever can be shifted. The shifting apparatus is small in size, low in cost, easy to operate, and stable in operation.

4 Claims, 13 Drawing Sheets

SHIFTING APPARATUS OF AUTOMATIC TRANSMISSION

BACKGROUND OF THE INVENTION

1. Technical Field

The present invention relates to a shifting apparatus of an automatic transmission for an automotive vehicle, and more specifically to a shifting apparatus of an automatic transmission mounted on a steering column and linked with a key lock mechanism.

2. Description of the Related Art

The shifting apparatus of an automatic transmission as described above is ordinarily composed of a control tube rotatably disposed in a steering column, a shift lever attached to a socket fixed to the steering column so as to be pivotal up and down, a compression rod engaged with the shift lever and axially movably inserted into the control tube, a selector member fixed to a portion projecting from the compression rod on the opposite side of the socket, a shift plate formed with stepped cutouts selectively engaged with the selector detent portion of the selector member, and a lock mechanism for locking the selector member in cooperation with the shift plate when the shift lever is located at Park position.

In the above-mentioned shifting apparatus having a lock mechanism for an automatic transmission, the important points required from the design and manufacturing stand points are as follows:

(1) The structure is simple.
(2) The operation is easy.
(3) The function is stable.
(4) The manufacturing cost is low.

However, no shifting apparatus for an automatic transmission which can satisfy all the above-mentioned requirements has been so far proposed.

SUMMARY OF THE INVENTION

With these problems in mind, therefore, it is the object of the present invention to provide a shifting apparatus for an automatic transmission which can satisfy all the above-mentioned requirements.

To achieve the above-mentioned object, the present invention provides a shifting apparatus for an automatic transmission mounted on a steering column (10), comprising: a shift lever (30) shifted from a park position to drive positions formed in a shift plate (61); a selector member (50) formed with a detent portion (51) selectively engaged with one of shift positions of the shift plate when said shift lever (80) is shifted; a shift lever lock mechanism having: a shift lock member (90) for locking said selector member (50); a switch (70) turned on by said selector member (50) when said shift lever is set to the park position; an actuator (80) energized when said switch (70) is turned on to move said shift lock member (90) to a shift lock position; and an actuation member (100) associated with said selector member (50) and the shift lock member (90) between the shift lock position and a shift unlock position; and a key lock mechanism (200) for locking and unlocking said actuation member (100) via a key lock cable (105).

In the shifting apparatus according to the present invention, when said shift lever (30) is shifted to the park position and an ignition key is removed from said key lock mechanism (200), said actuation member (100) is locked by said key lock mechanism (200) via the key lock cable (105) and thereby said lock member (90) is locked by said actuation member (100) at the shift lock position to lock said selector member (50). Further, when the ignition key is inserted into said key lock mechanism (200) and an engine is started and when a brake pedal is further depressed, said actuator (80) is deenergized to release said lock member (90); and further when said shift lever (30) is moved to move said selector member (50) away from said actuation member (100), said actuation member (100) is pivoted by a spring (102) of said actuation member, and thereby said lock member (90) is moved to the shift unlock position by said deenergized actuator (80), so that said shift lever can be shifted to a drive position and further the ignition key cannot be removed from said key lock mechanism. Further, when said shift lever (30) is shifted from the drive position to the park position again, said selector member (50) turns on said switch (70) to energize 5 said actuator (80) to move said lock member (90) to the shift lock position and said actuation member (100) is returned to the lock position by said selector member (50), so that the ignition key can be removed from said key lock mechanism (200).

The shifting apparatus for an automatic transmission according to the present invention is small in the number of parts, simple in structure, easy to assemble, small in size, low in cost, and stable in shift operation.

DETAILED DESCRIPTION OF THE EMBODIMENTS

Embodiments of the present invention will be described hereinbelow with reference to the attached drawings.

In the attached drawings, the feature of the present invention are that: the shifting apparatus of the automatic transmission attached to a steering column 10 resides in a shift lock mechanism F, which is composed of an actuator 80 actuated when parked, a lock member 90 pivoted by the actuator 80, a selector member 50 whose motion is limited by the lock member 90, and an actuation member 100 engaged with and disengaged from the selector member 50 and further locked or unlocked by the key lock mechanism (a cylinder key) 200.Further, when an engine is started, the actuation member 100 is unlocked by the key lock mechanism 200. Here, when a brake pedal is depressed, the actuator 80 pivots the lock member 90 in the shift unlock direction, so that the selector member 50 can be moved for shifting.

A first embodiment of the shifting apparatus will be explained hereinbelow with reference to FIGS. 1 to 11.

With reference to FIGS. 1 to 8, the shifting apparatus E is composed of a control tube 20 rotatably attached to a steering column 10 (as a vehicle body part) via a bracket 11, a shift lever 30 pivotally supported by a socket 21 fixed to the control tube 20 so as to be movable up and down (in the horizontal direction in FIG. 1) and further about the axis of the control tube 20 (in the vertical direction in FIG. 1), a compression rod 40 axially movably housed within the control tube 20 and engaged with the shift lever 30, a selector member 50 formed with detent portions 51 and fixed to compression rod 40 on the side remote from the socket 21, a shift plate 61 formed with stepped cutouts 61a (see FIG. 3) selectively engaged with a detent portion 51 of the selector member 50, and a shift lock mechanism F for limiting the movement of the selector member 50 in cooperation with the shift plate 61 and the selector member 50 when the shift lever 30 is set to a Park position.

The control tube 20 is arranged roughly in parallel to the steering column 10. One end (at which the socket 21 is attached) of the control tube 20 is supported by the bracket 11 fixed to the steering column 10, and the other end (remote from the socket 21) thereof is supported by a detent bracket 60.

The base portion of the shift lever 30 is composed of a pivotal portion 30a (see FIG. 1) and an engage portion 30b (see FIG. 2), and a knob 31 is attached to the top of the shift lever 30. The pivotal portion 30a is pivotally supported by a stepped pin 32 (see FIG. 3) in the socket 21 fixed to the control tube 20. Further, a nut 33 is screwed with this stepped pin 32. The engage portion 30b is formed into a spherical shape and engaged with a recessed portion 40a formed in the compression rod 40.

Figure 1:
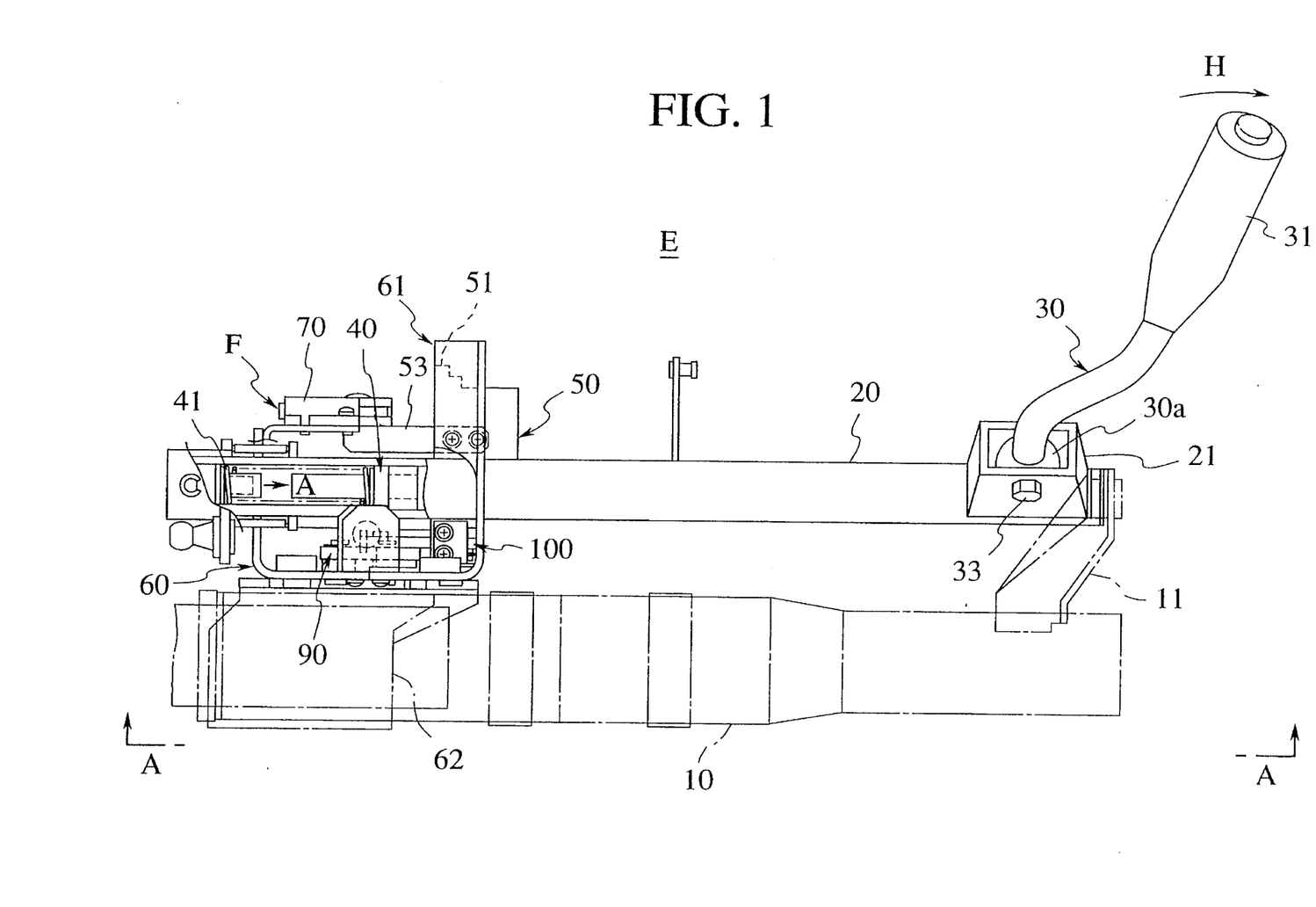
FIG. 1 is a front cross-sectional, partially perspective view showing a first embodiment of the shifting apparatus for an automatic transmission according to the present invention.
Figure 2:
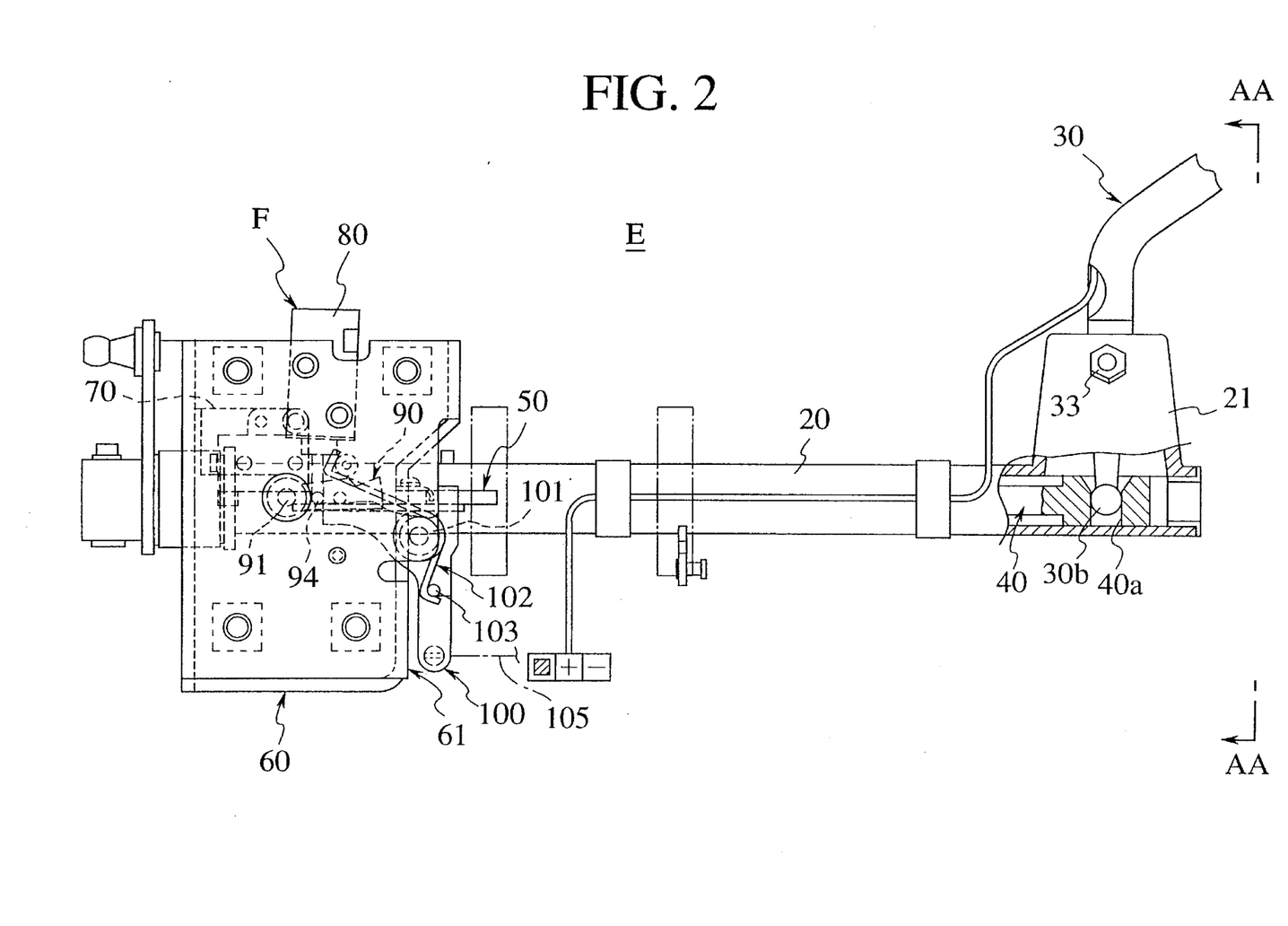
FIG. 2 is a side, partially broken view showing the same shifting apparatus, when seen from the side shown by arrows A—A in FIG. 1.
Figure 3:
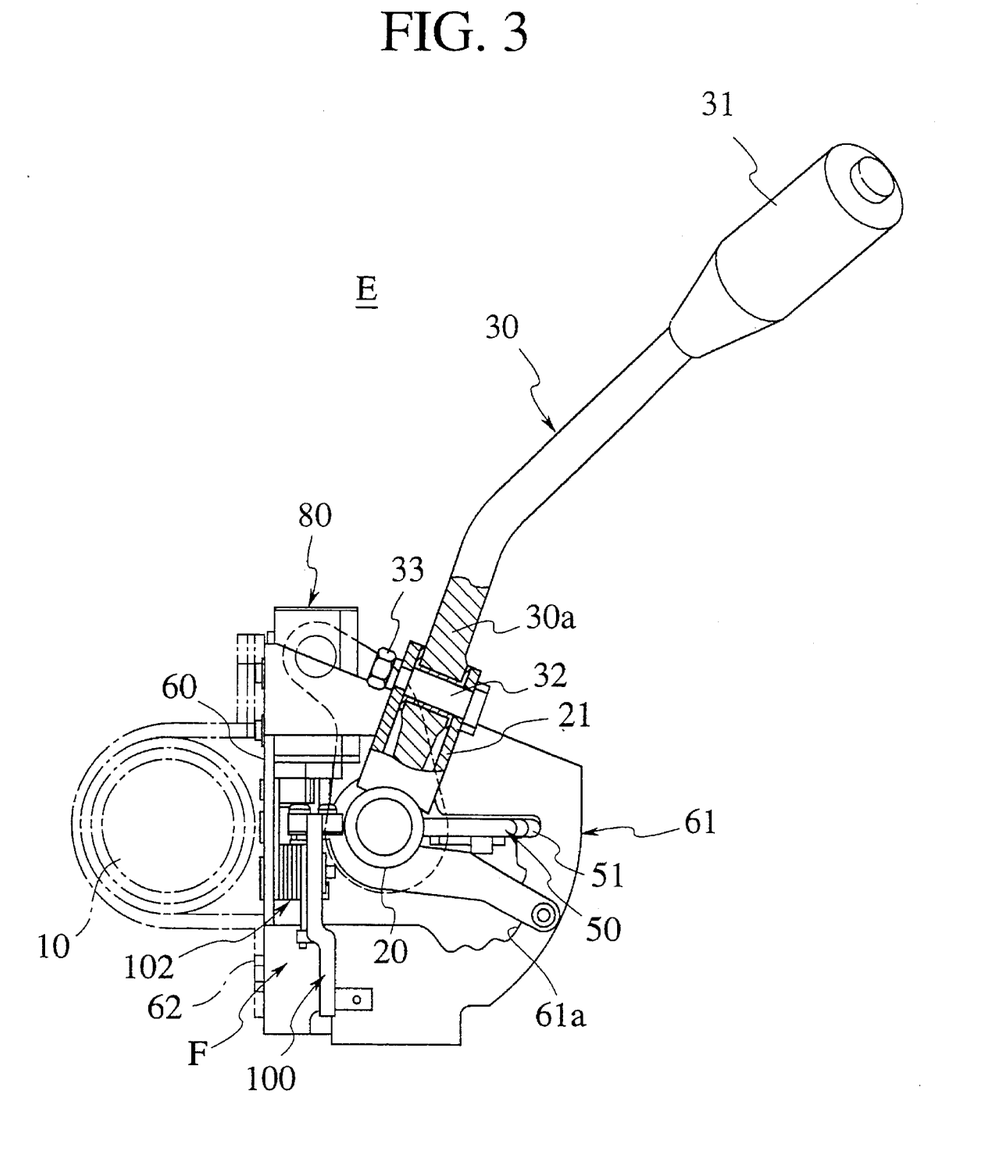
FIG. 3 is an end, partially cross-sectional view showing the same shifting apparatus, when seen from the end shown by arrows AA—AA in FIG. 2.
Figure 4:
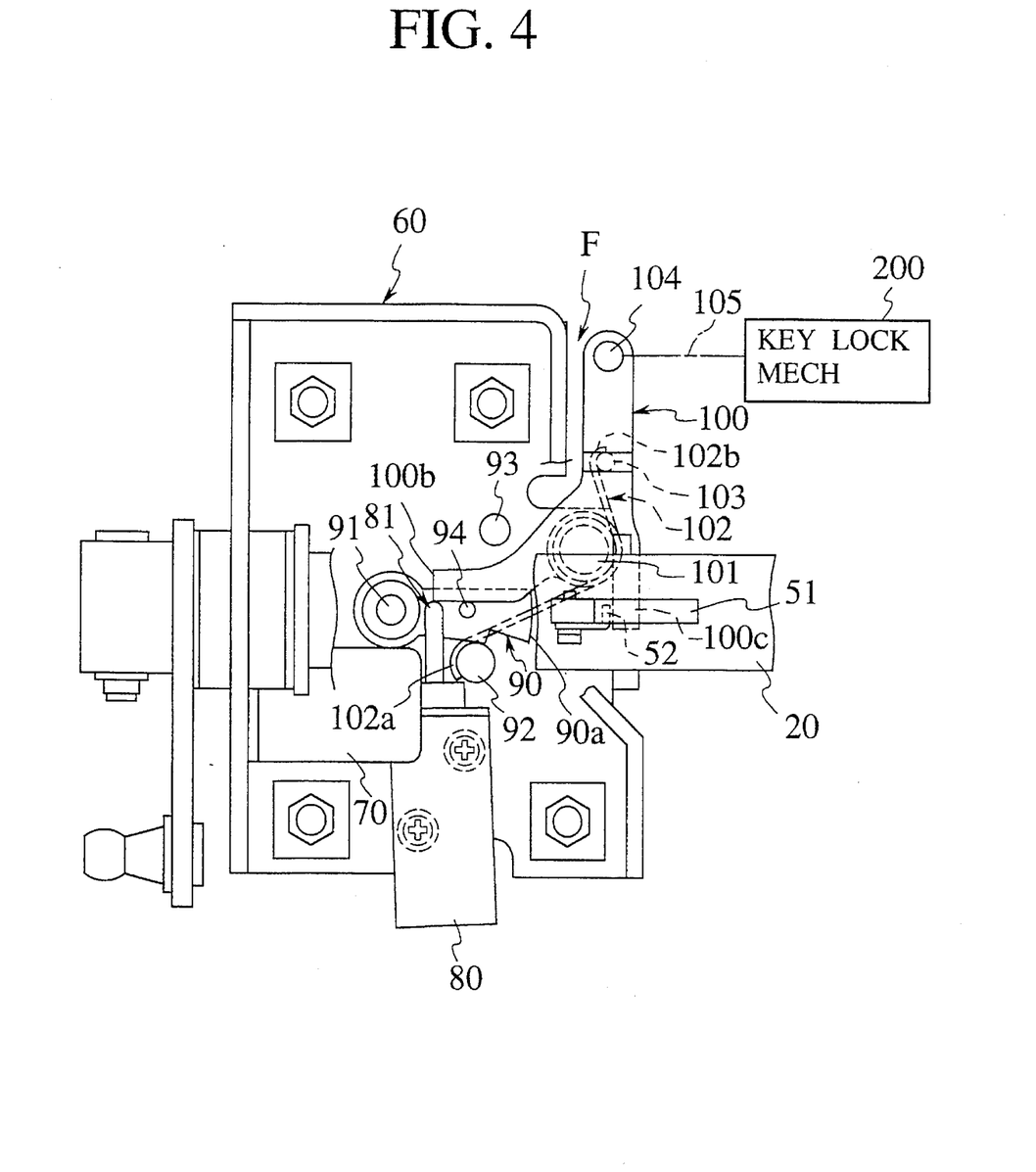
FIG. 4 is a top view showing an essential portion related to the shift lock operation of the shifting apparatus shown in FIG. 1.
Figure 5:
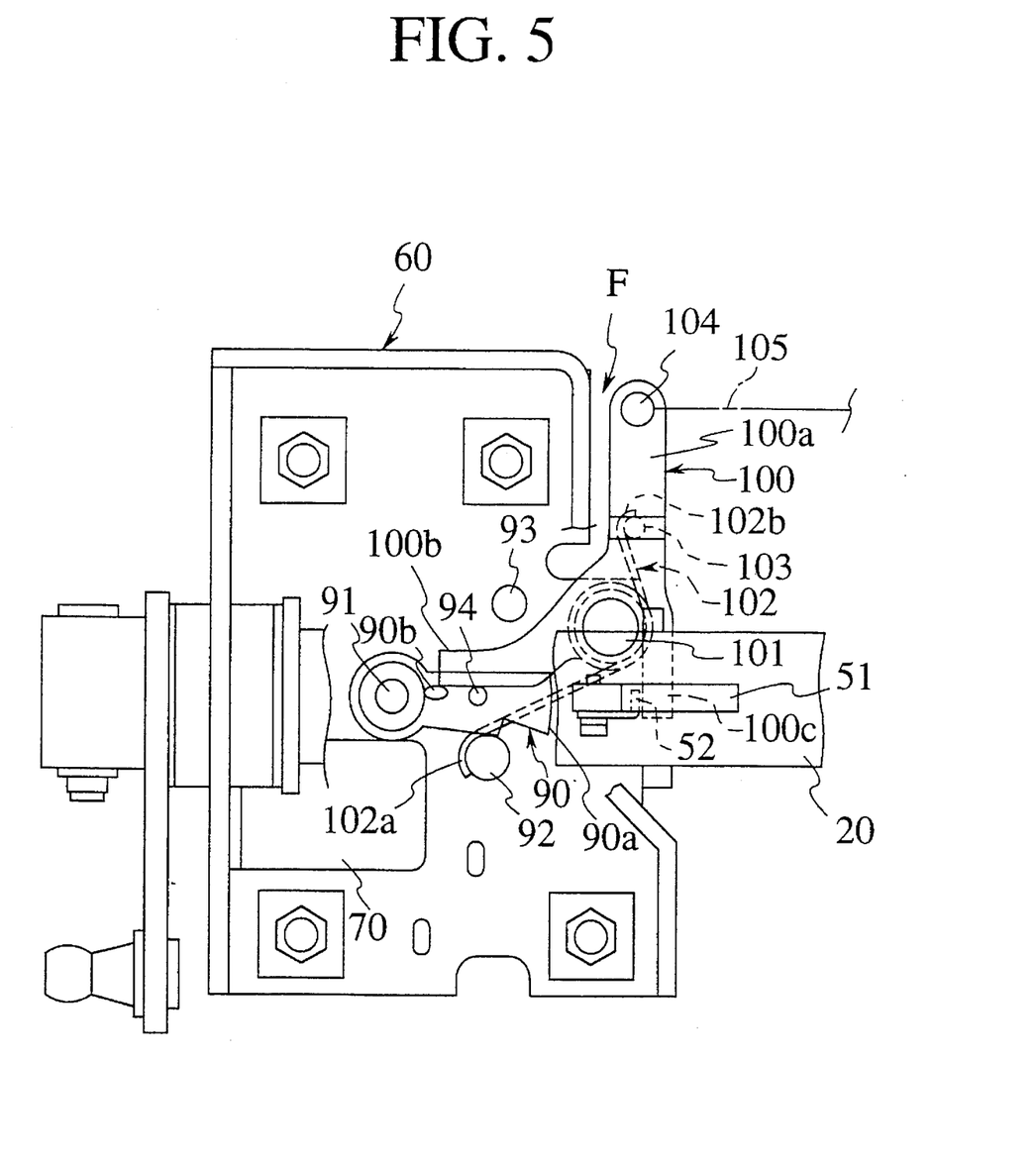
FIG. 5 is a top view shown in FIG. 4, but in which the solenoid is removed.
Figure 6:
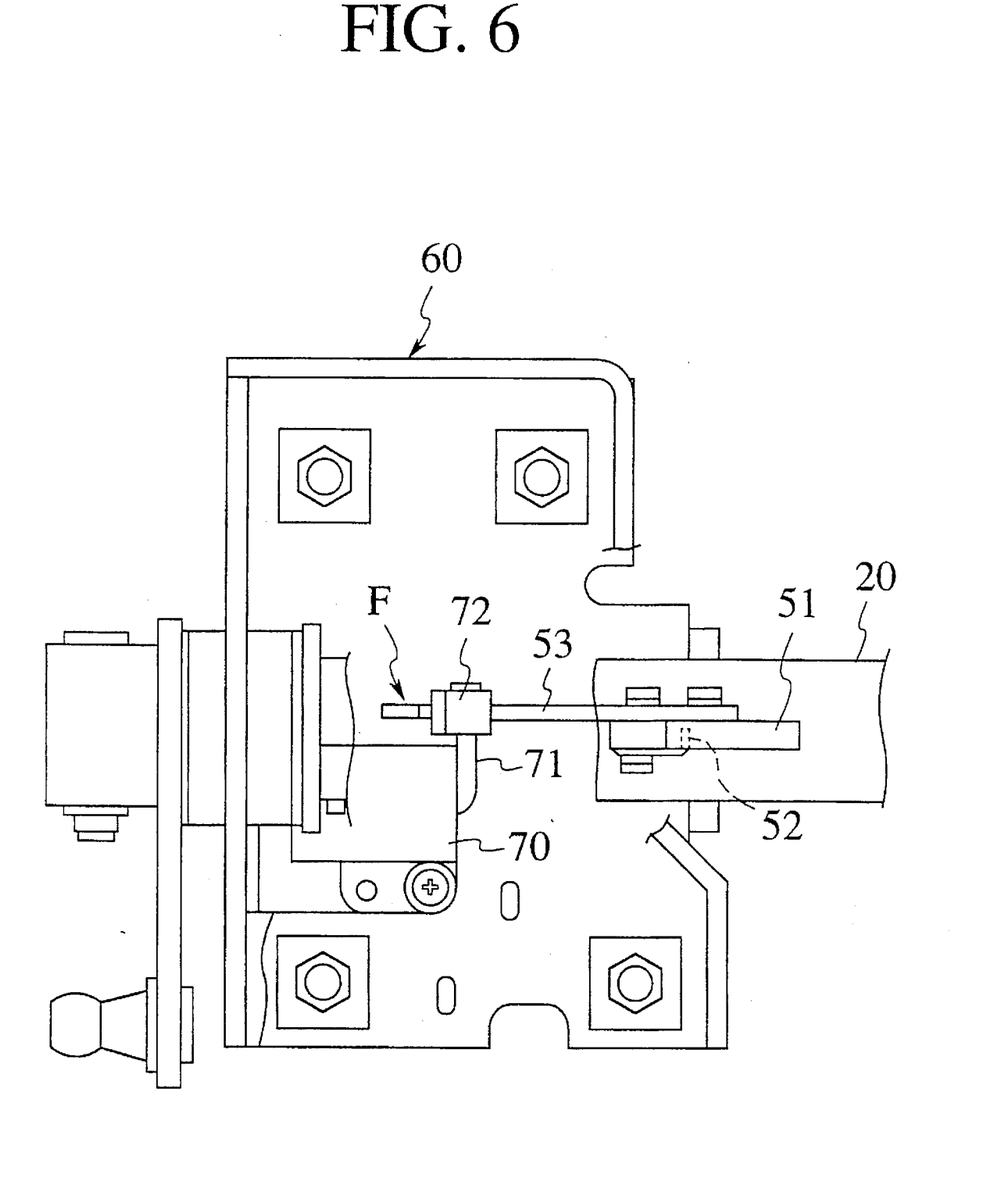
FIG. 6 is another top view showing an essential portion related to the shift lock operation of the shifting apparatus shown in FIG. 1.

The compression rod 40 is slidably inserted into the internal circumferential surface of the control tube 20, and urged in the direction of arrow A as shown in FIG. 1 by a return spring 41 disposed in the detent bracket 60, so that the shift lever 30 is always urged in the direction opposite to the direction A or H in FIG. 1 (i.e., downward direction).

The shift plate 61 (see FIGS. 1 and 3) is formed at a right angle with respect to the detent bracket 60 fixed to the steering column 10 via a mounting member 62 (i.e., extending radially with respect to the control tube 20), and formed with a plurality of stepped cutouts 61 a(see FIG. 3) in an inner portion thereof. The stepped cutouts 61a correspond to a plurality of shift positions such as Park, Reverse, Neutral, Drive, Second, First, etc.

The selector member 50 is formed into a plate shape, and fixed to an end (on the side remote from the socket 21) of the compression rod 40. The selector member 50 projects upward from the outer circumferential surface of the control tube 20, that is, perpendicular to the axial line of the compression rod 40, and formed with the detent portion 51 (see FIGS. 1 and 4) at the outwardly projecting portion thereof. The detent portion 51 is formed with a plurality of stepped portions selectively engaged with one of the stepped cutouts 61a of the shift plate 61. Further, an L-shaped arm 53 (see FIG. 7) is fixed to the selector member 50 so as to extend toward a switch 70. In addition, an L-shaped engage portion 52 (see FIGS. 4 and 7) is attached to a lower end portion of the selector member 50 (which projects downward from the outer circumferential surface of the control tube 20) in order to adjust the position of the selector member 50 relative to the shift plate 61.

The shift lock mechanism F is composed of the switch 70, the actuator 80, the lock member 90, and the actuation member 100.

The switch 70 is fixed to the detent bracket 60, and a rod 71 (a part of which projects outward) is slidably supported by the switch 70. This rod 71 is always urged inward of the switch 70 by a compression spring (not shown). This switch 70 is so disposed as to be turned on when an engage member 72 attached to an end of the rod 71 is engaged with the arm 53 of the selector member 50, when the shift lever 30 is shifted to the Park position cutout of the shift plate 61.

The actuator (solenoid) 80 is fixed to the detent bracket 60, and a rod 81 (a part of which projects outward) is slidably supported thereby. This rod 81 is always urged outward of the actuator 80 by a compression spring (not shown), and attracted inward when the switch 70 is turned on.

Figure 7:
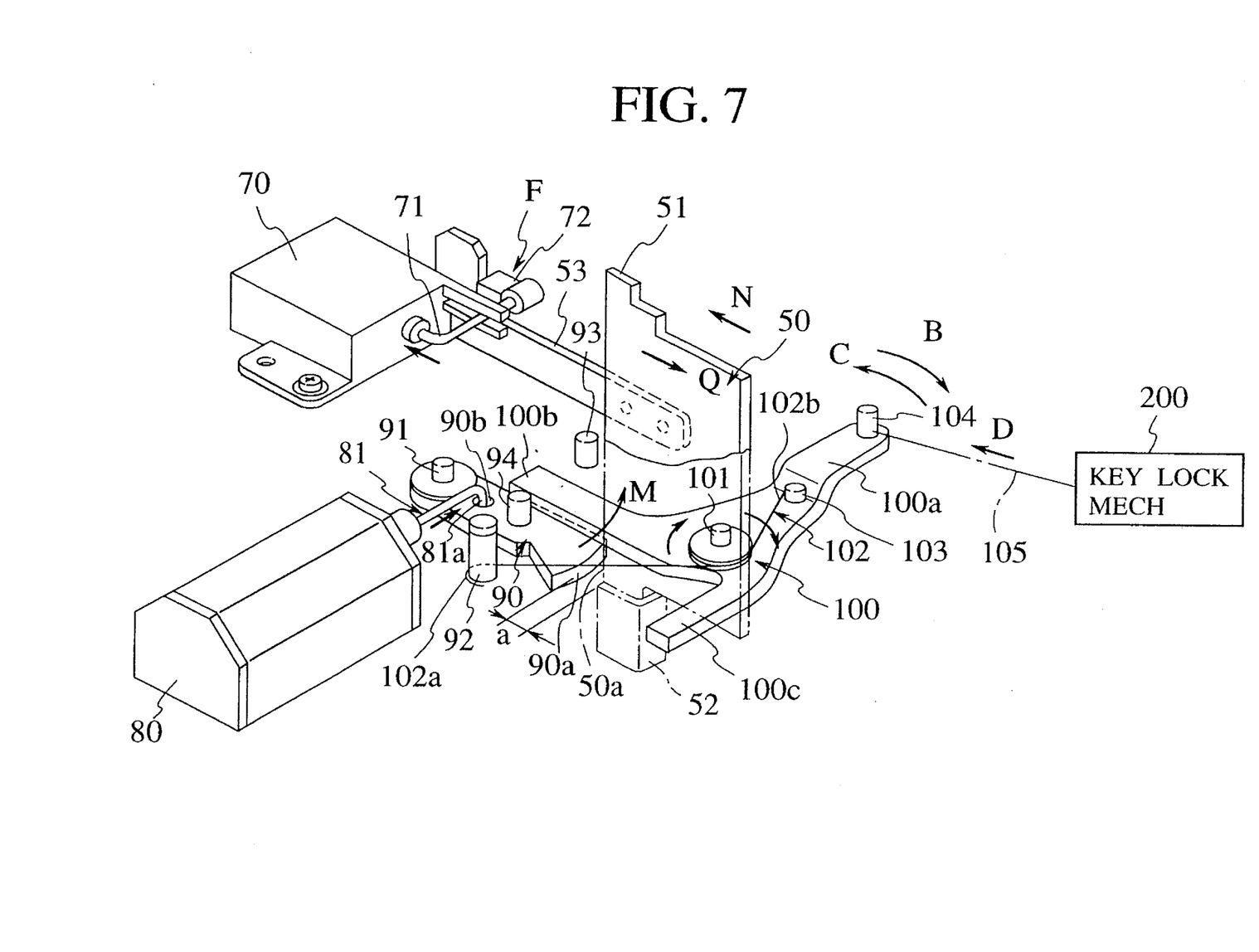
FIG. 7 is a perspective view showing an essential portion related to the shift lock operation of the shifting apparatus shown in FIG. 1.

The lock member 90 (see FIGS. 4 and 7) is pivotally supported by a pivotal axle 91 on the detent bracket 60 at an end thereof, and further formed with a circular arc-shaped lock surface 90a described with the pivotal axle 91 as its center. As depicted in FIG. 7, this lock surface 90a is is separated from the left end surface 50a of the selector by a gap (a) member 50, when the selector member 50 is at the Park position. Further, the lock member 90 is formed with a slot 90b on the base portion thereof, with which an end of the rod 81 of the solenoid 80 is engaged. Further, the pivotal motion of the member 90 is restricted by two stopper pins 92 and 93 implanted in the detent bracket 60.

The actuation member 100 is formed into a trifurcated shape having three arms 100a, 100b and 100c all extending from the base portion thereof in three different directions, and pivotally supported by a pivotal axle 101 on the detent bracket 60. A torsional coil spring 102 is wound around the pivotal axle 101, and one hook portion 102a of the torsional coil spring 102 is engaged with a stopper pin 92 and the other end hook portion 102b of the torsional coil spring 102 is engaged with an engage pin 103 implanted at an arm portion 100a of the actuation member 100. Therefore, the actuation member 100 is urged so as to be pivoted by this torsional coil spring 102 in the arrow direction B shown in FIG. 7. Further, a key lock cable 105 linked with a key lock mechanism ( a cylinder key into which an ignition key is inserted ) 200 is coupled to a link pin 104 implanted at the end of the arm portion 100a of the actuation member 100.

The arm portion 100b is located in contact with a link pin 94 implanted at the intermediate portion of the lock member 90, and the arm portion 100c is located in contact with the engage portion 52 of the selector member 50 when the selector member 50 is at the Park position.

The operation of the first embodiment of the shift apparatus will be described hereinbelow with reference to FIGS. 4 to 11.

When parking, the shift lever 30 is set to the Park position and an ignition key is removed from the key lock mechanism (cylinder key) 200. Under these conditions, the selector member 50 and the lock mechanism F (70, 80, 90 and 100) are all positioned as shown in FIG. 7. That is, the selector member 50 fixed to the compression rod 40 is shifted in the arrow direction Q to such a position that the detent portion 51 of the selector member 50 is engaged with the Park position of the stepped cutouts 61a of the shift plate 61 by a strong elastic force of the return spring 41 (see FIG. 1). Accordingly, as shown in FIG. 7, the engage portion 52 of the selector member 50 pivots the actuation member 100 in the arrow direction C (against the elastic force of the torsional coil spring 102) by the elastic force of the return spring 41. Therefore, since the key lock cable 105 is pulled in the arrow direction D, the ignition key can be removed from the key lock mechanism 200. After the ignition key is removed, the key lock cable 105 is locked by the key lock mechanism 200 and further the shift lever 30 is locked.

In more detail, under these conditions, although the arm 53 of the selector member 50 is in contact with the engage member 72 of the switch 70, the switch 70 is kept turned off. Therefore, the solenoid 80 is deenergized, so that the rod 81 is allowed to project by the compression spring. In this case, however, since the arm portion 100b of the actuation member 100 is in contact with the link pin 94 of the lock member 90, the lock member 90 cannot be pivoted in the arrow direction M. As described above, the lock member 90 is locked by the actuation member 100.

Under these conditions, if the shift lever 30 is attempted to be shifted from the Park position to a Drive position by disengaging the detent portion 51 of the selector member 50 from the Park position cutout of the shift plate 61 (i.e., by moving the selector member 50 in the direction N), since the left end surface 50a of the selector member 50 is brought into contact with the lock surface 90a of the lock member 90, it is impossible to shift the shift lever 30 from the Park position (i.e, to move the selector member 50 in the direction N), so that the shift lever 30 can be locked at the Park position.

Figure 10:
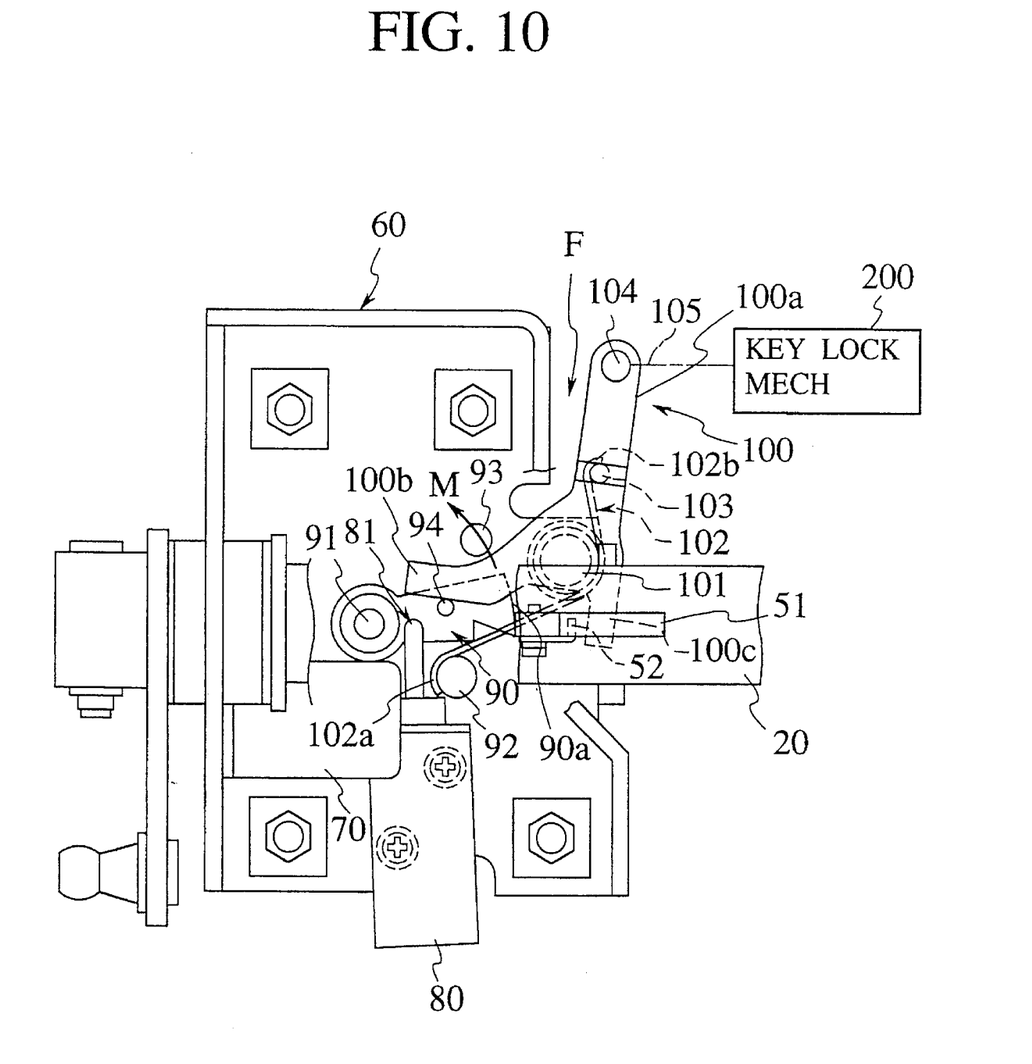
Figure 11:
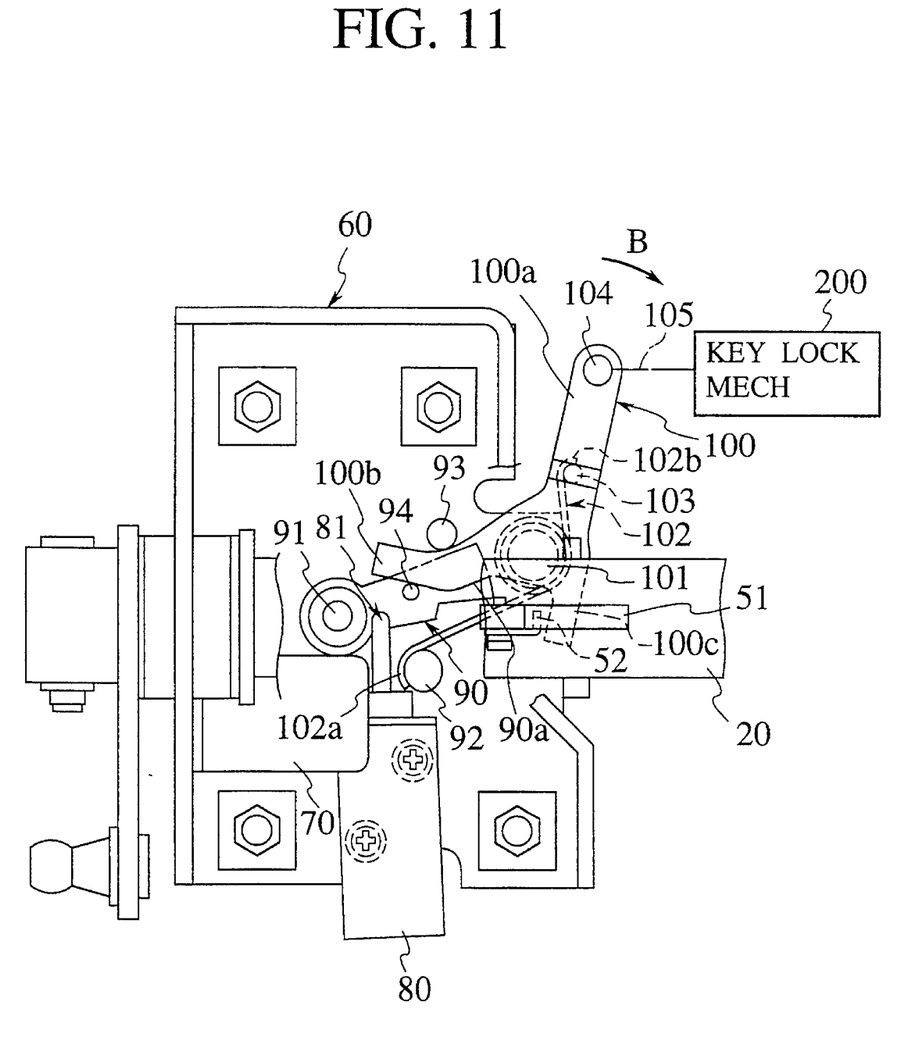

When the shift lever 30 is required to shift from the Park position to a Drive position, the ignition key must be inserted into the key lock mechanism 200 and turned to start the engine. Then, the solenoid 80 is at once energized to pull the rod 81. At the same time, the key lock mechanism 200 is unlocked, so that the key lock cable 105 is released. Therefore, the actuation member 100 is urged into contact with the selector member 50 by an elastic force of the torsional coil spring 102. After that, when the brake pedal is depressed, the solenoid 80 is deenergized and thereby the rod 81 projects to pivot the lock member 90 in the arrow direction M. In this case, however, the pivotal motion of the lock member 90 is restricted by the arm portion 100b of the actuation member 100. However, when the shift lever 30 is pivoted in the direction H (toward the right side) in FIG. 1 against the elastic force of the return spring 41, the selector member 50 is shifted in the arrow direction N in FIG. 7 by a distance (gap a). Then, the actuation member 100 can be further pivoted in the arrow direction B in FIG. 9 by the elastic force of the coil spring 102, and thereby the lock member 90 can be pivoted in the direction M as shown in FIG. 10, so that the lock surface 90a of the lock member 90 is moved away from the movement locus of the left end surface 50a of the selector member 50, as shown in FIG. 7. Accordingly, the actuation member 100 can be further pivoted in the direction B until brought into contact with the stopper pin 93, as shown in FIG. 11 with the result that the key lock cable 105 is loosened. Under these conditions, the ignition key cannot be removed from the key lock mechanism 200. Under these conditions, when the shift lever 30 is further pivoted in the direction H in FIG. 1, the detent portion 51 of the selector member 50 is disengaged from the Park position cutout of the shift plate 61.

Here, the shift lever 30 is pivoted about the axis of the control tube 20, and then released when the detent portion 51 of the selector member 50 reaches a required Drive position. In this case, the detent portion 51 of the selector member 50 is engaged with the Drive position by the elastic force of the return spring 41.

Further, under these conditions, when the shift lever 30 is required to shift to the Park position again, the shift lever 30 is pivoted in the direction H in FIG. 1 against the elastic force of the return spring 41 to disengage the detent portion 51 of the selector member 50 from the Drive position cutout of the shift plate 61. Further, the shift lever 30 is pivoted about the axis of the control tube 20. When the shift lever 30 reaches the Park position, the shift lever 30 is released. Then, the detent portion 51 of the selector member 50 is engaged with the Park position cutout of the shift plate 61 by the elastic force of the return spring 41.

In this state, at the same time, since the arm 53 of the selector member 50 actuates the switch 70, the solenoid 80 is energized to pull the rod 81. Therefore, the lock member 90 is pivoted in the direction P in FIG. 8 and returned to the lock position as shown in FIG. 7. In the same way, the actuation member 100 is also returned to position as shown in FIG. 7 by the selector member 50, so that the ignition key can be removed from the key lock mechanism 200. As described above, the shift lever 30 can be shifted and further locked at the Park position again.

Figure 8:
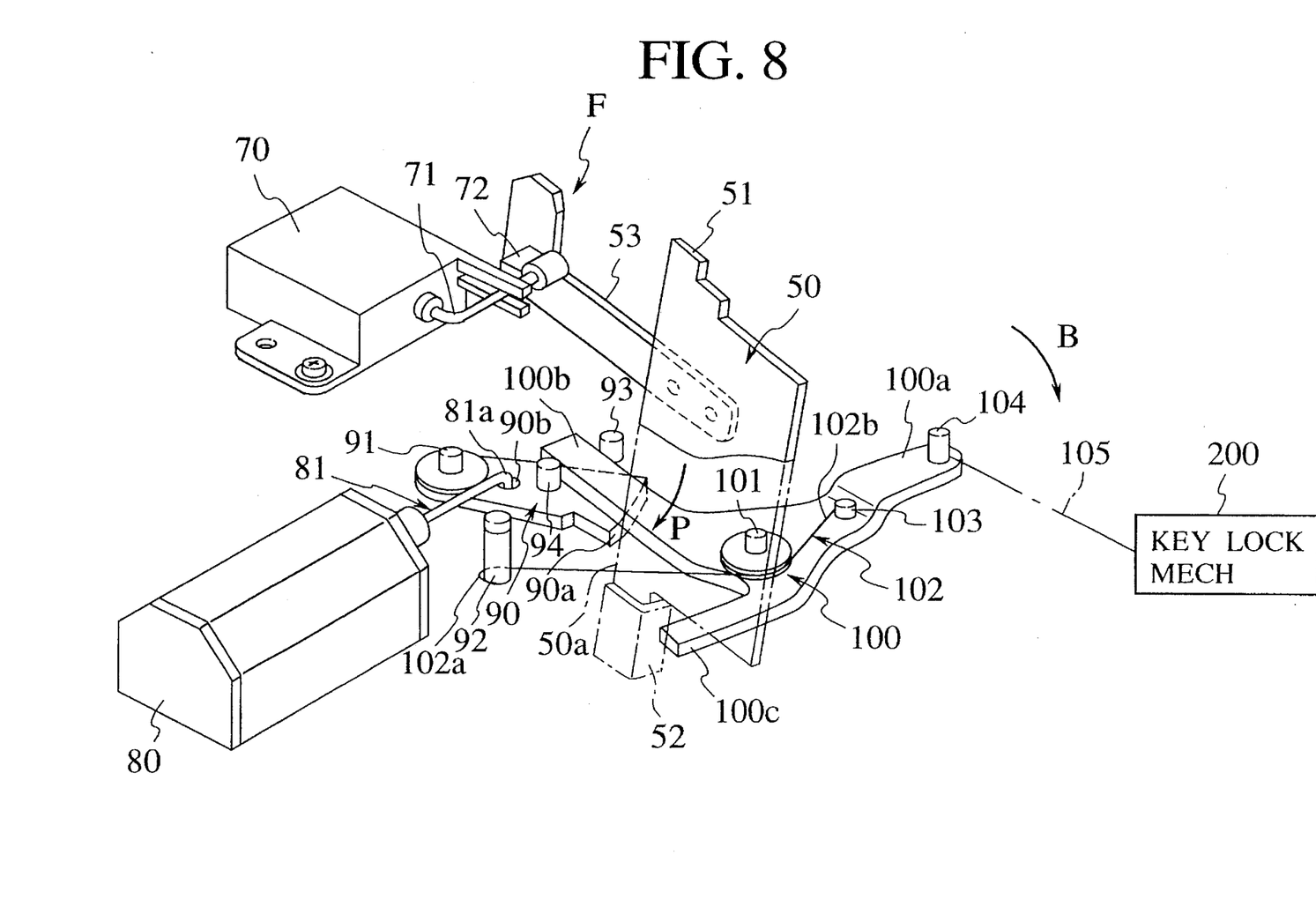
FIG. 8 is a perspective view showing an essential portion related to the shift unlock operation of the shifting apparatus shown in FIG. 1.
Figure 9:
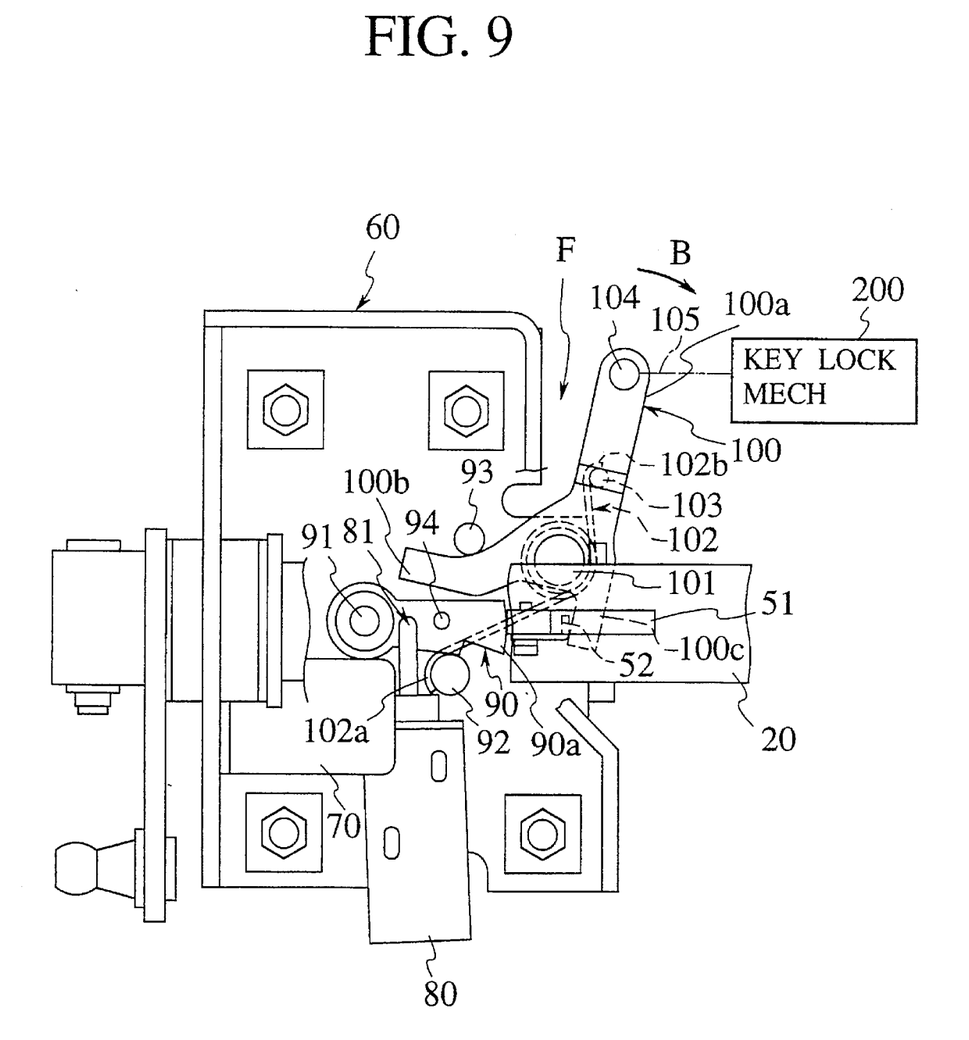
FIG. 9, 10, 11 are top views explaining the lock and unlock operation.
Figure 12:
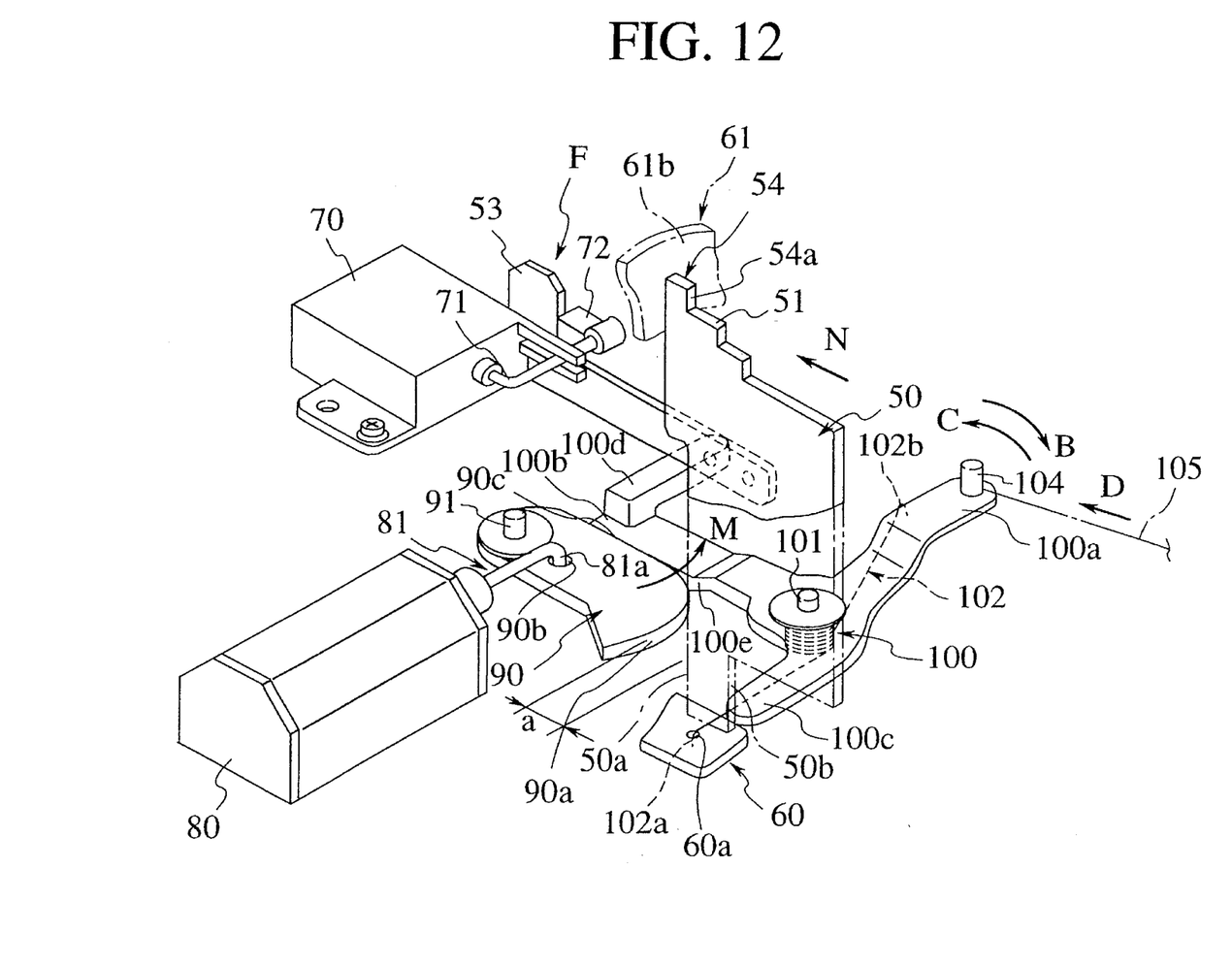
FIG. 12 is a perspective view showing an essential portion related to the shift lock operation of a second embodiment of the shifting apparatus according to the present invention.
Figure 13:
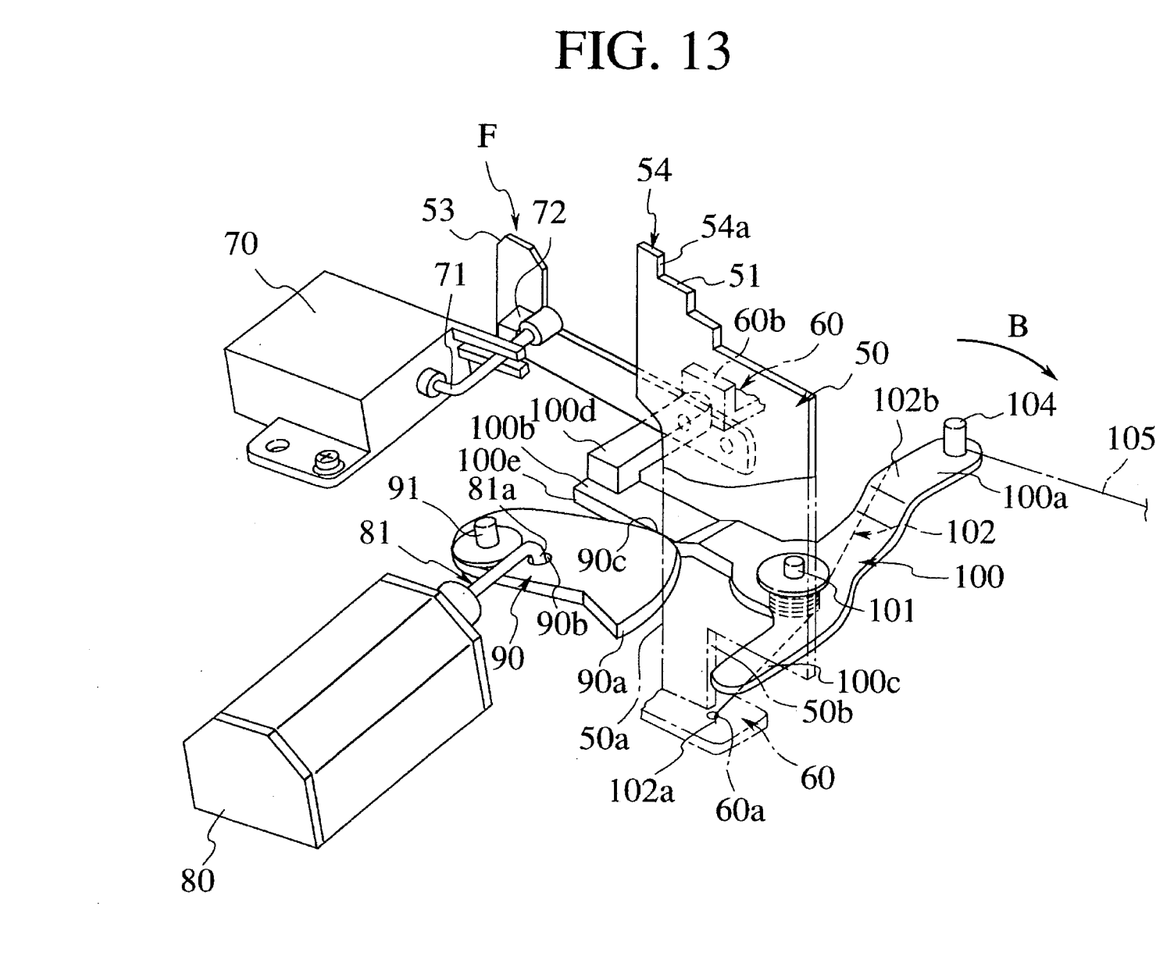
FIG. 13 is a perspective view showing an essential portion related to the shift unlock operation of the shifting apparatus shown in FIG. 12.

A second embodiment of the shifting apparatus according to the present invention will be described hereinbelow with reference to FIGS. 12 and 13 compared with FIG. 7 and 8. In this second embodiment, the selector member 50 is formed with an additional stopper portion 54 on the left end surface 50a thereof. This stopper portion 54 has a height different from the detent portion 51. Further, the stepped portion 54a of the stopper portion 54 is so designed as to be brought into contact with a side surface portion 61b formed over the stepped cutouts 61a (see FIG. 3) of the shift plate 61, when the detent portion 51 of the selector member 50 is engaged with the Park position of the stepped cutouts 61a of the shift plate 61. In addition, one hook portion 102a of the torsional coil spring 102 is engaged with an engage hole 60a formed in the detent bracket 60, and the other hook portion 102b thereof is engaged with the end side surface of the arm portion 100a of the actuation member 100. Owing to the construction as described above, it is possible to eliminate the stopper pin 92 and the engage pin 103 both used in the first embodiment shown in FIG. 7.

Further, in this second embodiment, a stopper arm 100d is additionally provided at the arm portion 100b of the actuation member 100 so as to project in the direction opposite to the lock member 90. As shown in FIG. 13, when the shift lock is released, this stopper arm 100d is brought into contact with a flange portion 60b of the detent bracket 60 to restrict the pivotal movement of the actuation member 100 in the arrow direction B. Owing to the construction as described above, it is possible to eliminate the stopper pin 93 used in the first embodiment shown in FIG. 7.

Further, the lock surface 90a of the lock member 90 is formed broader than that shown in the first embodiment. In this case, since the dimensional difference between the selector member 50 and the lock member 90 caused by manufacturing and assembly dispersion can be absorbed by the broad lock surface 90a, it is possible to eliminate the L-shaped engage portion 52 of the selector member 50 used in the first embodiment. In this case, further, it is possible to eliminate the mount position adjusting work of the engage portion 52 to the selector member 50.

Further, since the engage portion 52 is not used, the arm portion 100c of the actuation member 100 is so determined as to be brought into contact with the cutout portion 50b of the selector member 50 when the selector member 50 is located at the Park position.

Further, the side surface 100e (on the side of the lock member 90) of the arm portion 100b of the actuation member 100 is designed so as to be brought into contact with the side surface 90c (on the side of the actuation member 100) of the lock member 90 when the shift lever is locked as shown in FIG. 13. Owing to the construction as described above, it is possible to eliminate the link pin 94 used in the first embodiment shown in FIG. 7.

The construction and the operation other than the above description are substantially the same as with the case of the first embodiment, so that any detailed description of the second embodiment is omitted herein.

As described above, the second embodiment provides such advantages that the number of parts can be reduced markedly, the structure can be simplified, the adjustment work can be reduced, the assembly workability can be improved, etc.

As described above, the shifting apparatus according to the present invention can provide various advantages such that: the structure can be simplified, the number of parts can be reduced, the apparatus size can be reduced, the operation reliability can be improved, the lever shift operation can be facilitated, the manufacturing cost can be reduced, etc.

What is claimed is:

1. A shifting apparatus for an automatic transmission mounted on a steering column (10), comprising:

a shift lever (30) shiftable between a park position and drive positions formed in a shift plate (61);

a selector member (50) having an arm (53), said arm being formed with a detent portion (51) selectively engaged with one of a plurality of shift positions of said shift plate when said shift lever (30) is shifted;

a shift lever lock mechanism having:
  a shift lock member (90) for locking said selector member (50);
  a switch (70) turned on by said arm (53) of said selector member (50) when said shift lever is set to the park position;
  an actuator (80) energized when said switch (70) is turned on to move said shift lock member (90) to a shift lock position; and
  an actuation member (100) associated with said selector member (50) and said shift lock member (90) between the shift lock position and a shift unlock position; and
a key lock mechanism (200) for locking and unlocking said actuation member (100) via a key lock cable (105).

2. A shifting apparatus for an automatic transmission mounted on a steering column (10), comprising:

a shift plate defining a park position and drive positions;

a selector member (50) formed with a detent portion (51) selectively engaged with one of said positions;

a shift lever (30) engaged with said selector member (50) for shifting said selector member between the park position and drive positions;

a shift lever lock mechanism having:
  a shift lock member (90) for locking said selector member (50);
  a switch (70) turned on by said selector member (50) when said shift lever is set to the park position;
  an actuator (80) energized when said switch (70) is turned on to move said shift lock member (90) to a shift lock position; and
  an actuation member (100) associated with said selector member (50) and the shift lock member (90) position; and
a key lock mechanism (200) including a key lock cable (105) for locking and unlocking said actuation member (100); and
wherein when said shift lever (30) is shifted to the park position and an ignition key is removed from said key lock mechanism (200), said actuation member (100) is locked by said key lock mechanism (200) via the key lock cable (105) and thereby said lock member (90) is locked by said actuation member (100) at the shift lock position to lock said selector member (50).

3. A shifting apparatus for an automatic transmission mounted on a steering column (10), comprising:

a shift plate defining a park position and drive positions;

a selector member (50) formed with a detent portion (51) selectively engaged with one of said positions;

a shift lever (30) engaged with said selector member (50) for shifting said selector member between the park position and drive positions;

a shift lever lock mechanism having:
  a shift lock member (90) for locking said selector member (50);
  a switch (70) turned on by said selector member (50) when said shift lever is set to the park position;
  an actuator (80) energized when said switch (70) is turned on to move said shift lock member (90) to a shift lock position; and
  an actuation member (100) associated with said selector member (50) and the shift lock member (90) position; and
a key lock mechanism (200) including a key lock cable (105) for locking and unlocking said actuation member (100); and
wherein when the ignition key is inserted into said key lock mechanism (200) and an engine is started and when a brake pedal is further depressed, said actuator (80) is deenergized to release said lock member (90); and further when shift lever (30) is moved to move said selector member (50) away from said actuation member (100), said actuation member (100) is pivoted by a spring (102) of said actuation member, and thereby said lock member (90) is moved to the shift unlock position by said deenergized actuator (80), so that said shift lever can be shifted to a drive position and further the ignition key cannot be removed from said key lock mechanism.

4. The shifting apparatus for an automatic transmission of claim 3, wherein when said shift lever (30) is shifted from the drive position to the park position again, said selector member (50) turns on said switch (70) to energize said actuator (80) to move said lock member (90) to the shift lock position and said actuation member (100) is returned to the lock position by said selector member (50), so that the ignition key can be removed from said key lock mechanism (200).

* * * * *